United States Patent [19]

McAulay et al.

[11] 4,197,662
[45] Apr. 15, 1980

[54] MEANS FOR DRIVING THE BACK WALLS OF A BUCKET EXCAVATOR

[75] Inventors: Hubert J. McAulay, Tulsa; Orville B. Francis, Claremore, both of Okla.

[73] Assignee: Unit Rig & Equipment Co., Tulsa, Okla.

[21] Appl. No.: 938,857

[22] Filed: Sep. 1, 1978

[51] Int. Cl.$^2$ .............................................. E02F 3/24
[52] U.S. Cl. ............................... 37/189; 37/DIG. 2; 198/705
[58] Field of Search ................... 37/189, 190, DIG. 2, 37/91, 94–97; 198/509, 701, 703–706, 712–714

[56] References Cited

U.S. PATENT DOCUMENTS

| | | | |
|---|---|---|---|
| 857,396 | 6/1907 | Hammond | 198/705 X |
| 1,336,657 | 4/1920 | Schmidt | 37/189 |
| 1,434,601 | 11/1922 | French | 198/705 X |
| 1,516,428 | 11/1924 | Handley | 198/705 X |
| 1,797,330 | 3/1931 | Cothay | 198/705 |
| 2,652,791 | 9/1953 | Liston | 198/705 X |
| 3,230,647 | 1/1966 | Gates | 198/705 X |
| 4,155,181 | 5/1979 | Satterwhite | 37/190 |
| 4,156,977 | 6/1979 | Satterwhite | 37/190 |
| 4,157,623 | 6/1979 | Satterwhite | 37/190 |

*Primary Examiner*—E. H. Eickholt
*Attorney, Agent, or Firm*—William S. Dorman

[57] ABSTRACT

Means for driving the back walls of the buckets of an excavating wheel having a plurality of circumferentially arranged digging buckets. Each digging bucket is provided with a pivotal back wall mounted on the excavating wheel. The excavating wheel is rotatably mounted on a central shaft. A central sprocket is freely rotatably mounted on a bucket wheel hub which is mounted on the central shaft. A mounting bracket is attached directly to the main frame of the vehicle and extends outwardly therefrom. An offset sprocket which is smaller in diameter than the central sprocket is rotatably attached to the opposite end of the bracket. The axes of rotation for the central sprocket and the offset sprocket are parallel. A continuous chain passes around the sprockets with the chain constrained to move in a predetermined path. Push rods are pivotally attached at one end to connecting links of the chain so that the push rods are disposed at equal intervals along the length of the chain. Each push rod is also pivotally attached at its opposite end to one of the pivotal back walls of the digging buckets. Each push rod, as the link to which it is attached passes near and over the offset sprocket, urges its associated back wall to pivot outwardly relative to the central shaft to an extreme outward position which is the material dumping position of the digging bucket. A controlled amount of slack is maintained in the chain so as to impart a whip-like effect to the pivotal connecting links, increasing the velocity of outward wall movement. The push rod also urges its associated back wall to pivot inwardly relative to the central shaft after its associated link has passed over and beyond the offset sprocket to an inner position which is the material receiving position of the digging bucket.

5 Claims, 6 Drawing Figures

MEANS FOR DRIVING THE BACK WALLS OF A BUCKET EXCAVATOR

BACKGROUND OF THE INVENTION

1. Field of the Invention

This invention relates to a means for driving the back walls of a bucket excavator. More particularly, this invention relates to a means for driving the back wall of a bucket excavator which utilizes a constrained chain which is engaged with two sprockets, and a plurality of push rods which are pivotally attached to the chain and to the back walls.

2. Description of the Prior Art

References made to the following U.S. Pat. Nos. Satterwhite, 3,896,571, "Multi-Wheeled Excavator and Conveying System," issued on July 29, 1975; Satterwhite, 3,897,109, "Multi-Wheeled Excavation and Loading System," issued on July 29, 1975.

The two Satterwhite patents show and describe an excavation system which incorporates several rotatable excavation wheels provided with a plurality of digging buckets disposed between each of the wheels. Each digging bucket is provided with a cutting edge extending slightly beyond the rim of the excavation wheel. The cutting edge extends inward to form a stationary front wall. The backwall of the digging bucket is pivotally mounted on the excavation wheel near the rear surface of the front wall of the next bucket along the circumference of the excavation wheel. The back wall pivots so that it is free, opposite end is adjacent its associated front wall. As the excavation wheel is rotated against the material to be excavated, the cutting edge collects material which is forced inward along the front wall and against the back wall by the later collected material. It is desirable to dump the collected material on to a conveyoer to remove it from the operational site. As the excavation wheel is rotated, each digging bucket, which is now filled, passes adjacent to a conveyor belt. While the digging bucket is adjacent to the conveyor belt, it is desirable to pivot the back wall outwardly becuase the movement of the back wall will result in the dumping of the material from the digging bucket.

The Satterwhite patents described several different means for driving the back wall. One means disclosed is an unconstrained chain with push rods attached at one end to the links of the chain. The push rods are pivotally attached at an opposite end to the back wall. The chain passes over a roller which urges the push rods outward and, in turn, the back wall pivots outwardly along the front walls dumping the excavated material. The chain is unconstrained and is subject to all the streses, instabilities, and breakdowns known in the art to occur with such unconstrained systems. For example, the pivotal connecting links are not rotatably connected to the links of the chain and a torque will be present at the connections between the chain links and the pivotal connecting links. Therefore, the pivotal connecting links will not be aligned but rather will be twisted relative to the direction of movement of the chains. Any jerk which occur will not be evenly distributed down the links of the chain because of the twisting movement.

SUMMARY OF THE INVENTION

The present invention involves a means for driving the back walls of the buckets of an excavating wheel which is rotatably mounted on a central shaft and which is provided with a plurality of digging buckets arranged circumferentially around the wheel. Each digging bucket has a cutting edge extending beyond the rim of the wheel. The cutting edge extends inward relative to the central shaft to connect with a stationary front wall of the digging bucket. The remainder of the digging bucket consists of a movable back wall. Each back wall extends from its pivotal attachment toward the front wall of its digging bucket. The free, opposite end of the back wall moves along the surface of the front wall when the back wall pivots. A central sprocket is freely rotatably mounted on a bucket wheel hub which is mounted on the central shaft with its axis of rotation being the longitudinal axis of the central shaft. A smaller offset sprocket is attached to a mounting bracket which is attached to the main frame of the vehicle. The axis of rotation of the smaller offset sprocket is parallel to the longitudinal axis of the central shaft. A continuous chain composed of links passes around the sprockets with a controlled amount of slack. Thus, the chain is constrained to move in a predetermined path. A plurality of push rods is provided. Each push rod is pivotally attached to a pivotal connecting link of the chain at one end and at the opposite end to one of the back walls.

As the excavation wheel is rotated, some of the push rods connected to the back walls pull on the chain and some will push on the chain. This causes the chain to move which, in turn, rotates both of the sprockets. As each push rod approaches and passes around the offset sprocket the push rod will urge its associated back wall to pivot outwardly relative to the central shaft to a material dumping position. After each push rod has passed around the offset sprocket, the push rod will urge its associated back wall to pivot inwardly relative to the central shaft to a material receiving position. As the excavation wheel continues to rotate each push rod will continue to push or pull the chain in a cyclical pattern and will repeat the above described operation.

DETAILED DESCRIPTION OF THE PREFERRED EMBODIMENTS

Figure 1A:
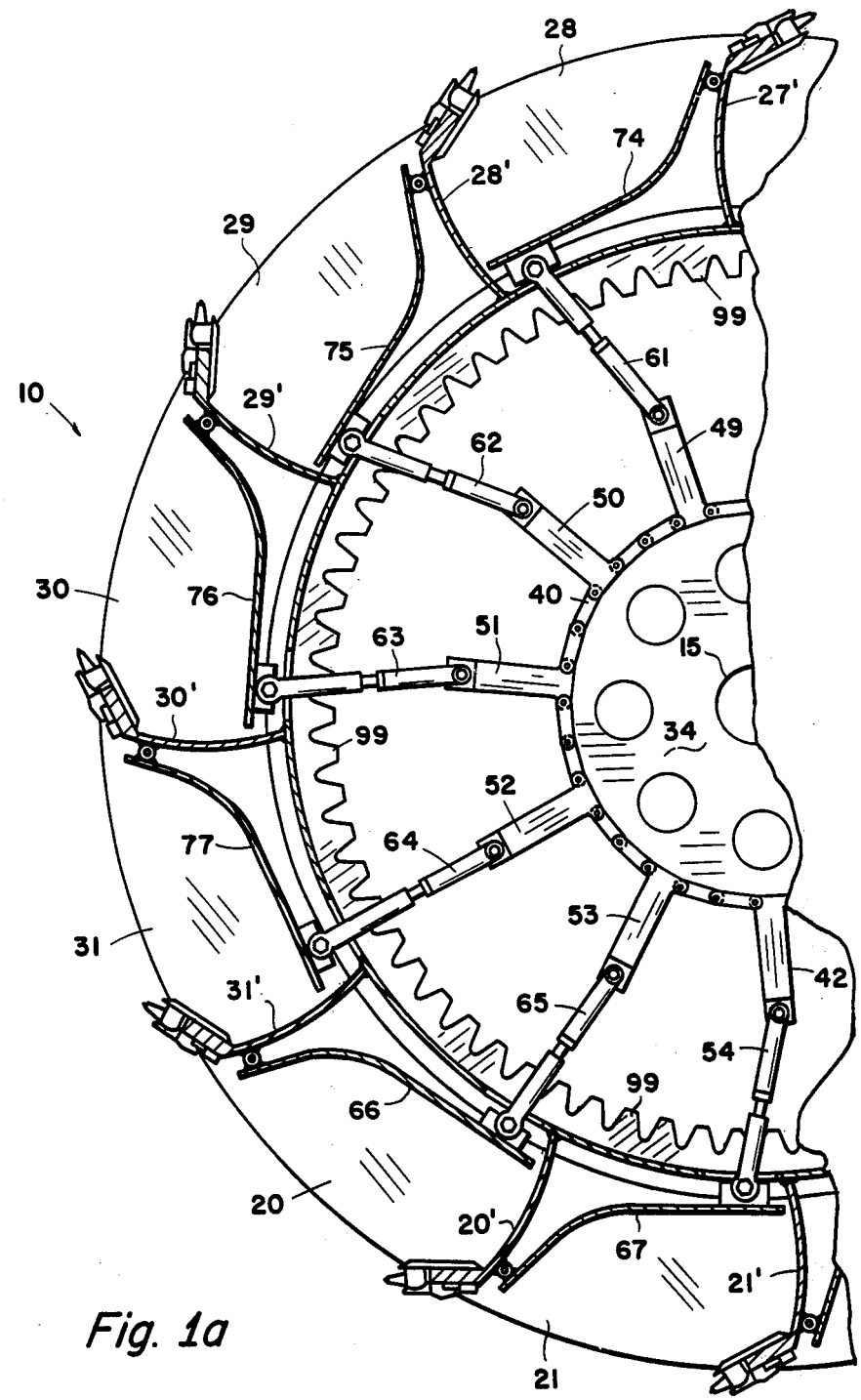
FIG. 1a is a side view showing the left side of an excavating wheel with means for driving the back walls constructed according to the present invention with portions broken away to reveal internal details.
Figure 1B:
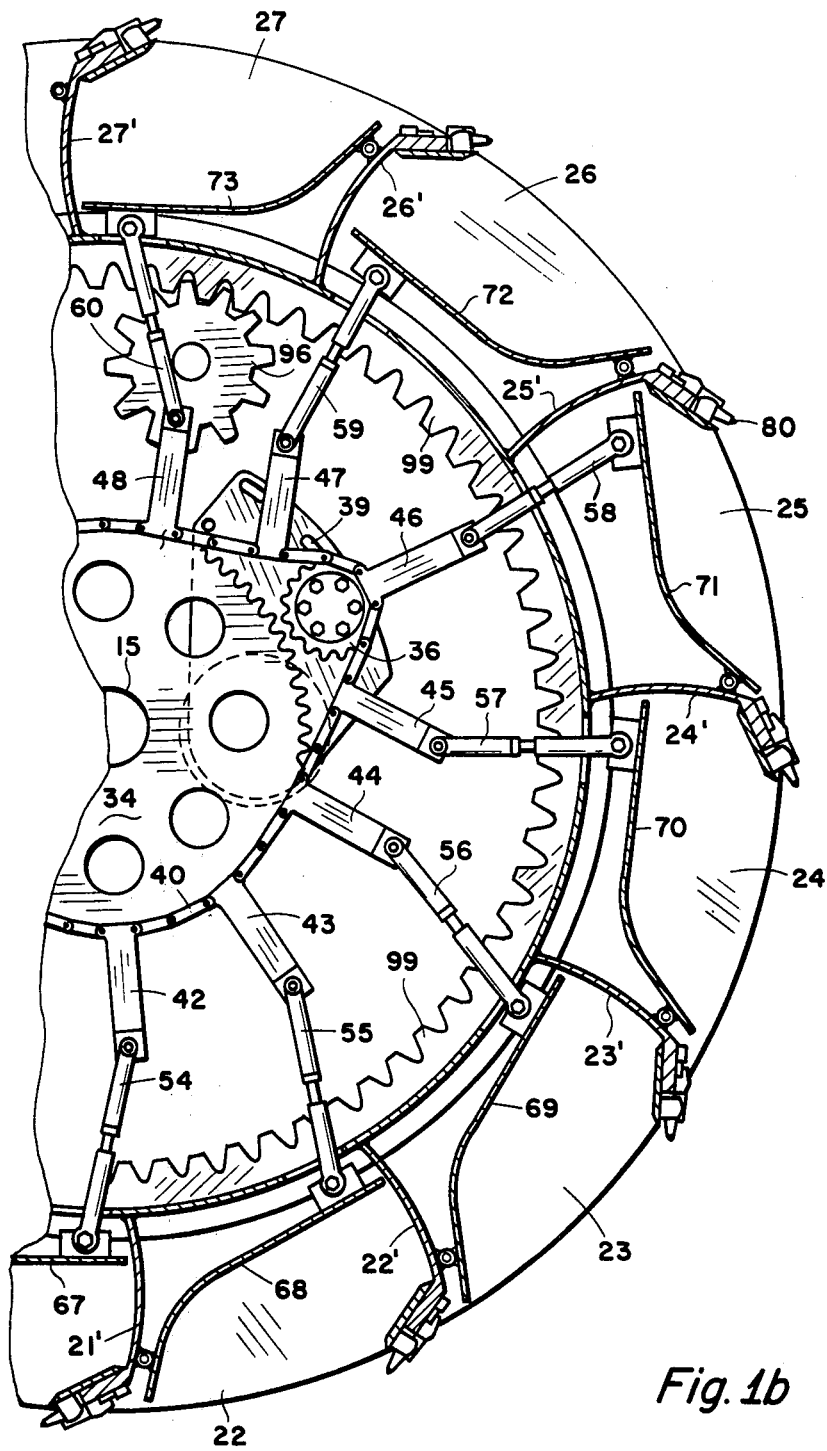
FIG. 1b is a side view showing the right side of an excavating wheel with means for driving the back walls constructed according to the present invention with portions broken away to reveal internal details.

As shown in FIGS. 1a and 1b, an excavating wheel 10 is rotatably mounted on a central axle or shaft 15 which would normally extend across the front end of a vehicle (not shown) of the type illustrated in Satterwhite U.S. Pat. Nos. 3,896,571 and 3,897,109. In a typical application of the invention there would be four excavating wheels 10 mounted on the central shaft 15 of the vehicle. The central shaft 15 may be stationary with each wheel mounted on the shaft bearings, that is, the shaft would not rotate with respect to the main frame of the vehicle (as shown in the Satterwhite U.S. Pat. Nos. 3,896,571 and 3,897,109. Alternatively, the shaft may rotate on bearings in the frame and the shaft and wheel rotate at the same speed. The excavating wheel 10 is broadly similiar to any one of the three excavating wheels disclosed in the aforementioned Satterwhite patents. Excavating wheel 10 is provided with a plurality of circumferentially spaced stationary walls 20' through 31' (hereinafter sometimes referred to as stationary front walls). All of the digging buckets 20 through 31 are similar in construction.

Figure 2:
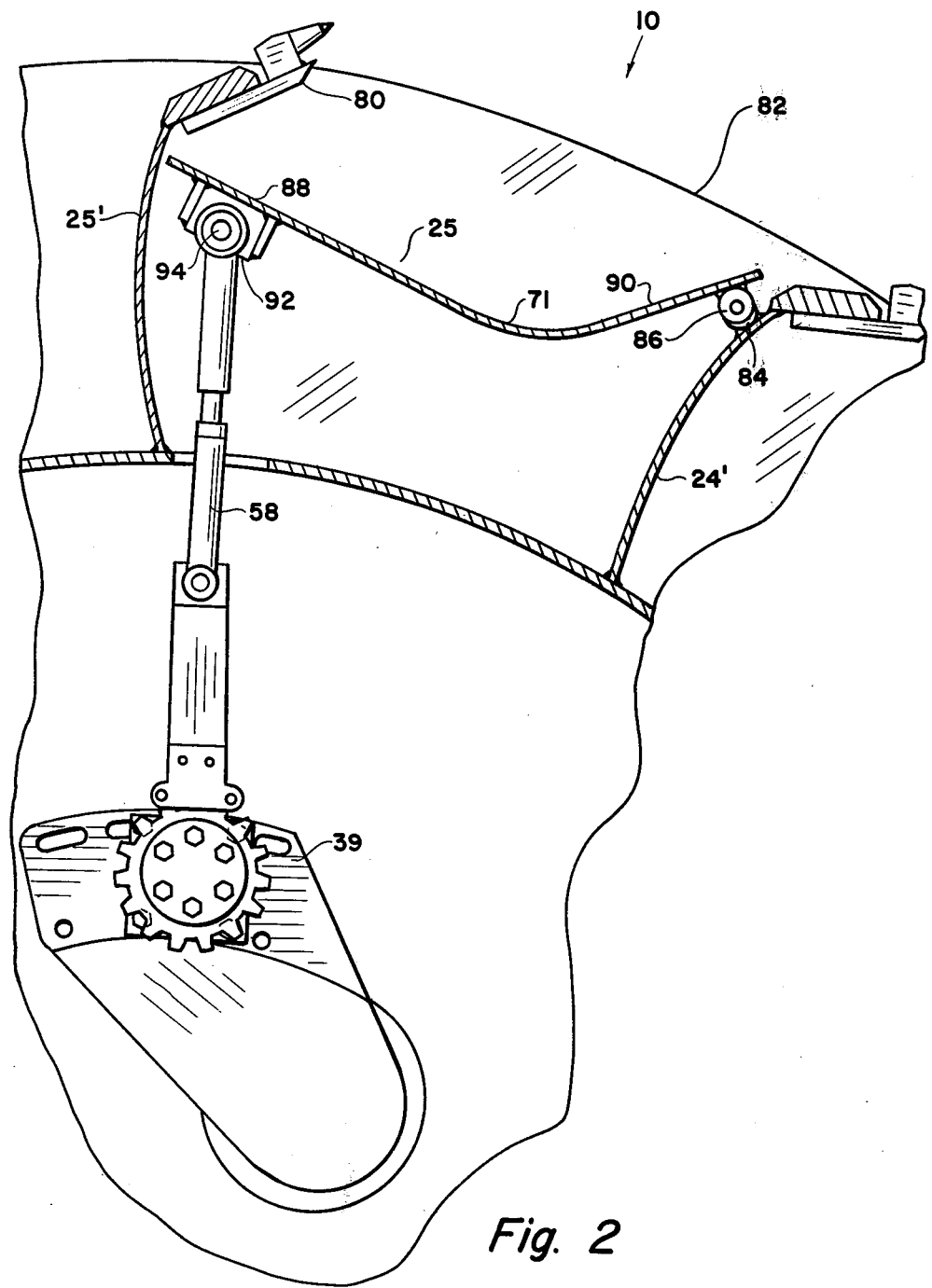
FIG. 2 is a perspective view of the offset sprocket and the mounting bracket of the bucket excavator shown in FIGS. 1a and 1b.

Freely rotatably mounted on the hub 12 of the excavating wheel 10 is a central sprocket or sprocket wheel 34. The hub 12 rotates on the central shaft 15. An offset sprocket 36 is freely rotatably mounted on shaft 38 (not shown in FIGS. 1a or 1b) so that its axis of rotation is parallel to the longitudinal axis of central shaft 15 although offset therefrom. A mounting bracket 39 is attached directly to the main frame of the vehicle by some standard method, for example, by being bolted. The bracket 39 is best seen in FIG. 2. Offset sprocket 36 and central sprocket 34 are aligned so that a continuous chain 40 may pass between and around portions of the sprocket with a controlled amount of slack in the chain. The chain is composed of links. Certain of the links 42 through 53 (which are spaced from each other) have push rods 54 through 65, respectively, pivotally attached thereto. These pivotal connecting links 42 through 53 are replaceable with pivotal connecting links of a different height, the longer the links, the faster the velocity of the back walls.

The push rods 54 through 65 extend generally outwardly relative to the central shaft 15 and are at their outer ends pivotally attached to the pivotal back walls of digging buckets 20 through 31, respectively.

As shown in FIG. 2, digging bucket 25 has a cutting edge 80 which extends beyond the rim 82 of excavating wheel 10. Cutting edge 80 extends from and connects with stationary front wall 25' of digging bucket 25. Digging bucket 25 is also provided with a pivotal back wall 71 which is pivotally attached to the rear of the front wall 24' of the next digging bucket 24. The pivotal attachment of the back wall 71 is by some standard method, for example, by providing ears 84 on back wall 71 and on front wall 24' and providing ears 84 with holes and passing rods or bolts 86 therethrough. Back wall 71 has a dogleg shape with two straight portions 88 and 90. Push rod 58 is pivotally attached to the back wall 71 along the straight portion 88. The pivotal attachment of push rod 58 to straight portion 88 is by some standard method, for example, by providing an ear 92 on straight portion 88 and passing a threaded bolt 94 through holes (not shown) in ear 92 and push rod 58 and placing a suitable nut on the threaded end of the bolt 94 for connecting push rod 58 to ear 92. The attachment of the pivotal back walls of all of the other digging buckets, 21 through 31, to their push rods 54 through 65, respectively, is similar to the attachment of push rod 58 to the back wall 71 of digging bucket 25.

Figure 4:
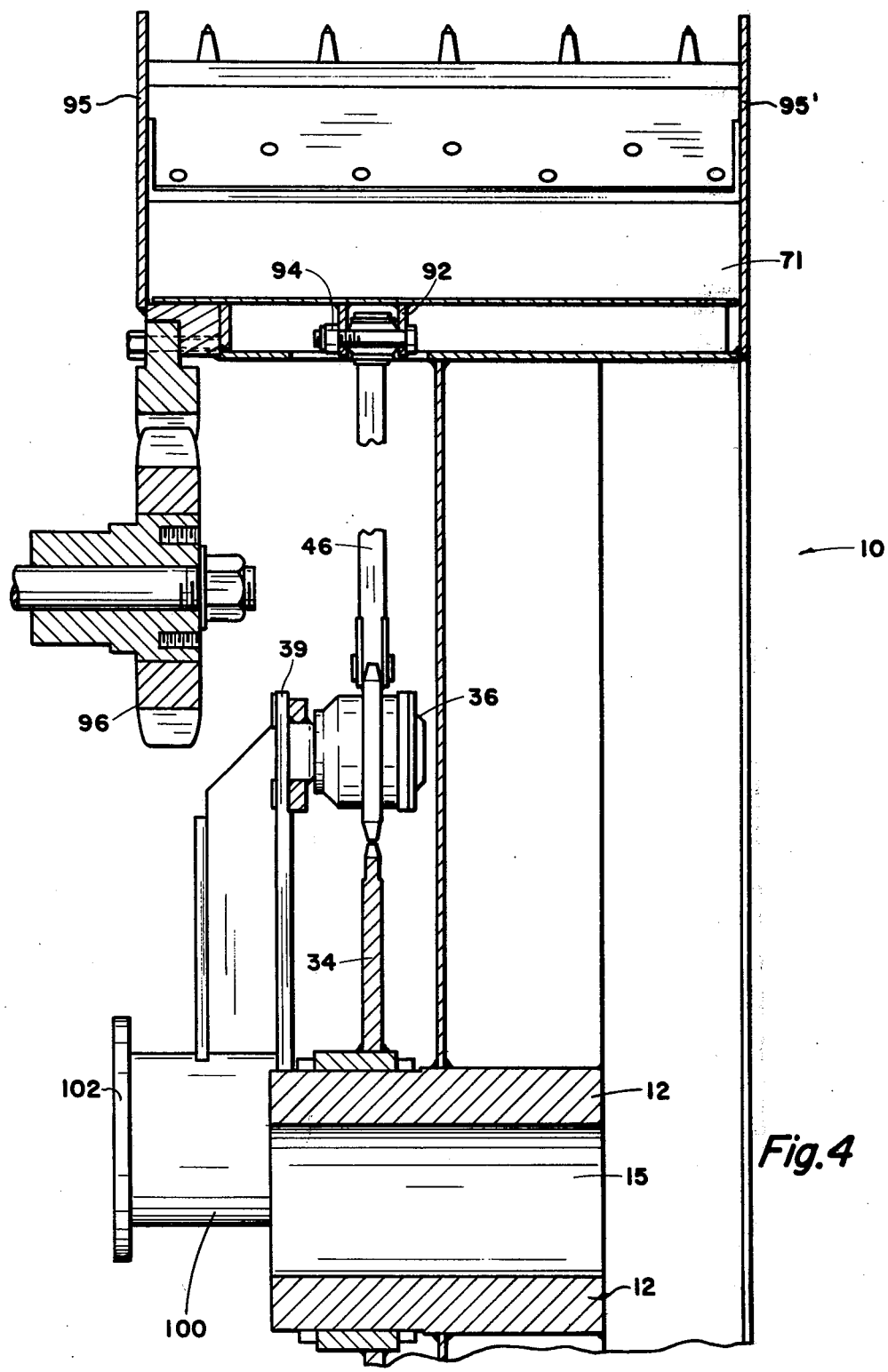
FIG. 4 shows a front view of the bucket excavator shown in FIGS. 1a and 1b with portions cut-away for clarity.

As best seen in FIG. 4, the back wall 71 extends laterally from one side wall to the other side wall, but is sufficiently spaced therefrom to allow the back wall to be freely pivoted. The front walls 20' to 31' of digging buckets 20 through 31 extend from side wall 95 to the other side wall 95' and are attached thereto. The front walls also extend in a generally radial direction towards the periphery of the wheel 10. The construction of the other digging buckets is similiar to the construction of digging bucket 25.

Returning to a consideration of FIGS. 1a and 1b, the excavating wheel 10 is rotated by a power means (not shown) which turns drive sprocket 96 in a clockwise direction. The drive sprocket engages with teeth 99 on the wheel 10, turning the wheel and that attached buckets. The protruding cutting edges of digging buckets 20 through 31 (which are all similar to cutting edge 80 of bucket 25) will contact and dislodge material to be excavated. This material is forced toward the back wall of the digging bucket. This part of the operation would ordinarily occur when the bucket wheel reached approximately the positon shown in FIG. 1 for digging buckets 21, 20, 31 and 30. As the excavating wheel 10 continues to rotate, each digging bucket will pass adjacent to a conveyor belt (not shown); at that time it is desired to pivot the back wall to force the material out of the bucket so that the material can drop onto the conveyor belt. This condition is represented by the positions occupied by buckets 26 and 25 in FIGS. 1a and 1b.

As the excavating wheel is rotated, the back walls of the buckets 20 through 31 will exert forces on the push rods 54 through 65. For example, back wall 74 will be pushing on push rod 61 while back wall 69 will be pulling on push rod 56. These forces will, in turn, cause chain 40 to move in a clockwise direction and in a predetermined path around sprockets 34 and 36 causing the latter to rotate in a clockwise direction also. The mounting bracket 39 will not move during the operation of the excavating wheel 10 because of the fixed attachment of the bracket to the main frame.

The back wall 71 has two extreme positions of pivotal movement. One is its furthest inward point relative to shaft 15 which is shown in digging buckets 23 and 27. As the link associated with each push rod approaches the offset sprocket 36, the back wall of the associated digging bucket, as shown by the back wall of bucket 25, is urged to pivot outwardly.

The extreme outward pivotal position of the back wall is the material dumping position. The back wall of digging bucket 25 is shown in the material dumping position. The material (not shown) which was collected while the digging bucket was in the positions shown by buckets 21, 20, 31, and 30 is dumped while the digging bucket is in the position shown by buckets 26 and 25.

As the excavating wheel 10 continues to rotate and the link of each push rod has, in turn, passed by offset sprocket 26 the back wall of the digging bucket is urged to pivot inward relative to central axle or shaft 15 towards the inward position. This is the material receiving position of the digging bucket and the digging bucket will remain in this position as the link of the associated push rod passes around central sprocket 34.

Figure 5:
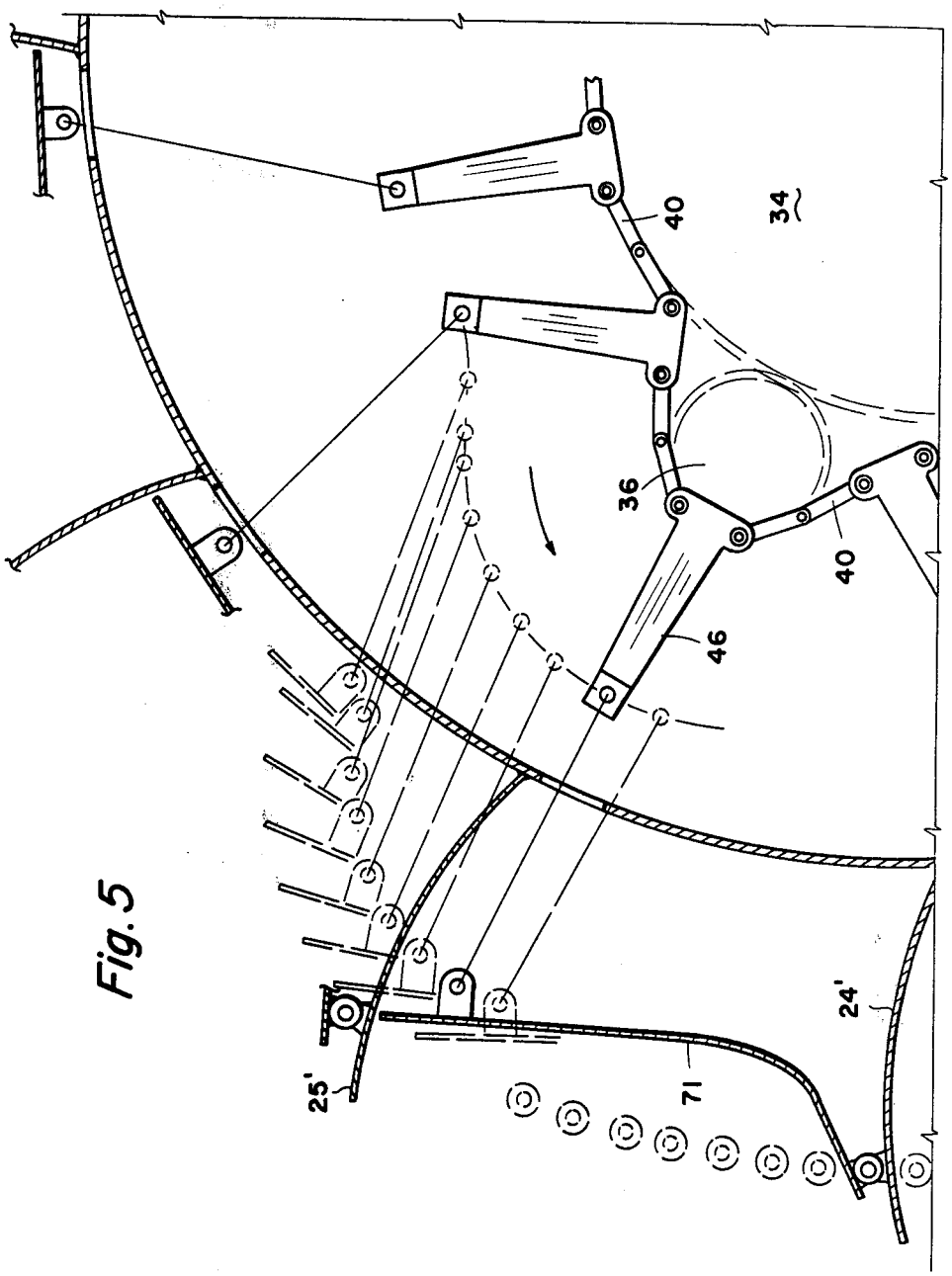
FIG. 5 is a mirror-image of the excavating wheel shown in FIGS. 1a and 1b illustrating the whip-like effect inmparted to the bucket back walls by maintaining a controlled amount of slack in the chain.

The chain 40, as shown in FIGS. 1a and 1b, is composed of links which engage the teeth of sprockets 34 and 36. Thus, the chain is constrained to follow a predetermined path of movement. Certain of the links 42 through 53 (which are spaced from each other) have push rods 54 through 65 respectively, pivotally attached thereto. The slack in the chain may be increased up to a point. As the slack in the chain is increased, the wrist-like or whip-like snap action of the links 42–53 increases and acceleration of the bucket back walls 66–77 is increased. A fast acceleration of the bucket back walls 66–77 is desirable to ensure that all of the extracted material in each bucket is dumped. This whip-like effect can best be seen in FIG. 5, which illustrates the movement of the pivotal links and the chain around the sprockets. It should be noted the FIG. 5 is a mirror-image of the excavating wheel shown in FIGS. 1a and 1b. The chain 40 sags slightly as it passes between the central sprocket 34 and the offset sprocket 36. As each pivotal connecting link 42–53 passes through this area, and in particular the upper end of each link furthest from the sprockets, its velocity is slowed slightly unitl just prior to reaching the offset sprocket, each link is nearly stagnant. When each pivotal connecting link reaches the offset sprocket, the whip-like effect is transmitted to each pivotal back wall. This whip-like effect can be seen by the series of positions back wall 71 takes prior to reaching the vertical dumping position in FIG. 5.

The amount of slack in the chain 40 can, of course, be adjusted by adjusting the center to center distance of the sprockets 34 and 36. The timing of the dumping action can be advanced or retarded by changing the circumferential position of the offset sprocket on the mounting bracket 39. Increasing the length of the connecting links 42–53 will also make the action more violent.

Figure 3:
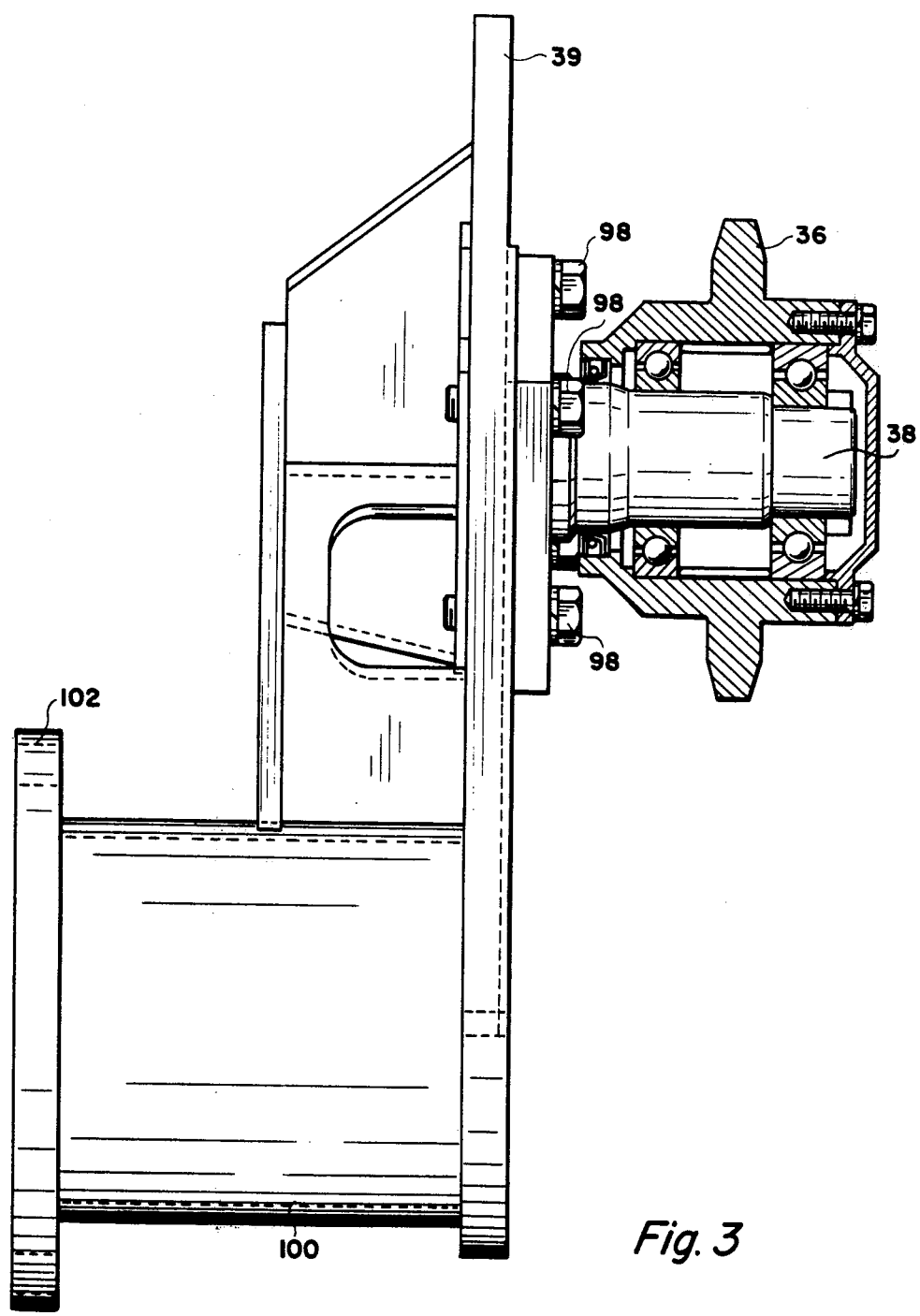
FIG. 3 shows the offset sprocket's positioning on the mounting bracket of the bucket excavator shown in FIGS. 1a and 1b.

FIG. 3 shows, in isolation, the offset sprocket 36, the accompanying shaft 38 and the mounting bracket 39. The offset sprocket is freely rotatably on the shaft 38. This assembly can be secured to the mounting bracket 39 by any standard method, for example, by bolts 98. A series of holes is provided in the mounting bracket 30 so that the position of the offset sprocket is adjustable.

FIG. 4 shows the offset sprocket 36 and the mounting bracket 39 in their positions relative to the excavating wheel 10. The mounting bracket 39, the pipe 100 and the circular plate 102 are shown in front of the central shaft 15 and the central sprocket 34 but they are not connected.

The sprockets 34 and 36 may be of various sizes although the diameter of sprocket 34 is preferably several times that of sprocket 36; thus, the relationship between the sprockets, as shown in FIGS. 1a and 1b, can be varied. It should be noted that the teeth on offset sprocket 36 and central sprocket 34 act as guides for the chain 40 rather than as a means of transmitting power. Therefore, other types of guide wheels could be used.

The push rods 54 through 65 are designed so that their lengths could be adjusted. Although FIGS. 1a and 1b show twelve digging buckets and associated push rods, the number of digging buckets and push rods could be more or less than twelve.

Whereas the present invention has been described in particular relation with the drawings attached hereto, it should be understood that other and further modifications, apart from those shown or suggested herein, may be made within the spirit and scope of this invention.

What is claimed is:

1. Excavating apparatus comprising a frame, a central shaft attached to said frame, a wheel formed from a pair of concentric circular side walls connected together in spaced parallel relation and freely rotatably mounted on said central shaft, a plurality of circumferentially spaced and stationary front walls extending transversely across said wheel and connected to said side walls, said stationary front walls also extending generally radially outwards toward the periphery of said side walls and terminating in cutting edges extending beyond the periphery of said circular side walls, said spaced stationary front walls forming a plurality of digging buckets located around the circumference of the excavating wheel, each bucket having a pivotal back wall extending between said side walls and pivotally connected thereto adjacent the periphery of said side walls and also adjacent the stationary front wall of the next adjacent bucket, each back wall being pivotal outwardly relative to said central shaft to a material dumping position and inwardly relative to said central shaft to a material receiving position, central chain guide means freely rotatably mounted on said central shaft, offset chain guide means freely mounted for rotation on an axis parallel to and adjustably spaced from said central shaft, a continuous chain formed from a plurality of links passing around said sprockets, a plurality of push rods, a plurality of pivotal connecting links spaced equally along said chain, one push rod for each pivotal back wall, each push rod being pivotally attached at one end to one of said pivotal back walls, an end of each push rod opposite from said one end being pivotally attached to ne of said connecting links of said chain, whereby when said wheel rotates, each push rod exerts force on each pivotal connecting link, moving said chain around said sprockets, and whereby movement of said chain causes each push rod to urge its associated back wall to pivot to its material dumping position as each push rod passes adjacent to said offset sprocket and thereafter pivoting its associated back wall to its material receiving position after said push rod passes beyond said offset sprocket.

2. Excavating apparatus as set forth in claim 1 wherein said central chain guide means includes a central sprocket and wherein said offset chain guide means includes an offset sprocket of smaller diameter than said central sprocket.

3. Excavating apparatus as set forth in claim 2 including a mounting bracket having two ends, one end attached to said frame, and an opposite end having a second shaft rotatably mounted thereon, said second shaft providing the axis of rotation for said offset sprocket.

4. Excavating apparatus as set forth in claim 1 whereby each pivotal connecting link of said chain is replaceable with a link of variable height, the longer said pivotal connecting links are, the faster the velocity of bucket back wall movement.

5. Excavating apparatus as set forth in claim 1 whereby a controlled amount of slack is maintained in said chain, imparting a whip-like effect to said connecting links and said push rods, increasing the velocity of bucket back wall movement.

* * * * *